United States Patent [19]
Kerkhof

[11] Patent Number: 5,442,808
[45] Date of Patent: Aug. 15, 1995

[54] SYSTEM AND DEVICE TRANSMITTING INFORMATION BY CHANGING A SUBSTRATE TEMPERATURE

[75] Inventor: Jacob Kerkhof, Hilversum, Netherlands

[73] Assignee: U.S. Philips Corporation, New York, N.Y.

[21] Appl. No.: 939,303

[22] Filed: Sep. 2, 1992

[30] Foreign Application Priority Data

Sep. 4, 1991 [EP] European Pat. Off. ............ 91202249

[51] Int. Cl.⁶ ............................................... H04B 5/02
[52] U.S. Cl. .......................................... 455/41; 455/73
[58] Field of Search ...................... 455/73, 41, 899, 40; 307/303, 303.1, 117; 337/102; 338/22 R, 23, 22 SD, 25; 375/7, 6; 327/564, 565, 566

[56] References Cited

U.S. PATENT DOCUMENTS

| | | | |
|---|---|---|---|
| 2,499,177 | 2/1950 | Baughman | 455/41 |
| 4,059,774 | 11/1977 | Cahen | 307/303 |
| 4,763,340 | 8/1988 | Yoneda et al. | 455/41 |
| 5,032,874 | 7/1991 | Matsuuchi | 355/285 |

FOREIGN PATENT DOCUMENTS 6085635 5/1985 Japan.
1042936 2/1989 Japan.

Primary Examiner—Edward F. Urban
Assistant Examiner—Nguyen Vo
Attorney, Agent, or Firm—David R. Treacy

[57] ABSTRACT

Prior-art telecommunication systems include transceiver arrangements structured, for example, as optocouplers for optically transmitting information, that is in a DC isolated manner. These optocouplers, which may transfer relatively high frequency signals are expensive. When the signal, to be transmitted has a low maximum frequency of about 200 Hz, a more cost-effective transceiver arrangement may be used, which comprises a transmitter means arranged for effecting a change of ambient temperature (a power dissipating resister) and comprises a receiver means arranged for detecting the change of ambient temperature (an NTC resister or a semiconductor element). In an advantageous embodiment transmitter means and receiver means are used in integrated form deposited each on either side of a substrate.

18 Claims, 1 Drawing Sheet

SYSTEM AND DEVICE TRANSMITTING INFORMATION BY CHANGING A SUBSTRATE TEMPERATURE

BACKGROUND OF THE INVENTION

The invention relates to a telecommunication system comprising a transceiver arrangement which includes transmitter means and receiver means for mutually transmitting information in a DC isolated manner.

A telecommunication system of this type, such as, for example, a business telephone exchange, is widely known. These exchanges comprise detectors which include each the transceiver arrangement structured as a transformer or as an optocoupler. In the event of a transformer, information is transmitted inductively, that is in a DC isolated manner, between the transmitter means arranged as a primary winding and the receiver means arranged as a secondary winding. In the event of an optocoupler, information is transmitted optically, that is in a DC isolated manner, between the transmitter means arranged as a LED (Light Emitting Diode) and the receiver means arranged as a light-sensitive transistor. When a current flows through the LED, it transmits photons. A number of these photons hit the light-sensitive base of the transistor, rendering this transistor conductive. The magnitude of the current determines the number of transmitted photons and thus also the extent to which the transistor becomes conductive.

A telecommunication system of this type comprising transceiver arrangements arranged as transformers or optocouplers has the detrimental effect that these transceiver arrangements are relatively expensive. Furthermore, transformers and optocouplers require an additional operation because they are not integrable and are thus to be soldered with their DIL housing onto a printed circuit board.

SUMMARY OF THE INVENTION

It is an object of the invention to provide a telecommunication system comprising cheaper transceiver arrangements. Another object of the invention is to provide a transmission system suitable for transmitting signals with a maximum frequency of approximately 200 Hz.

For this purpose the telecommunication system according to the invention is characterized in that the transmitter means is essentially arranged for realising a change of ambient temperature and the receiver means is essentially arranged for detecting the change of ambient temperature.

For relatively low signal frequencies in the transceiver arrangement of the information to be transmitted it is no use utilizing, for example, a relatively expensive optocoupler which is designed for much higher signal frequencies. Optical information transmission is a fast process asking for a considerable degree of accuracy and, as a result, is relatively expensive. The invention is based on the recognition that information transmission by means of changes in ambient temperature is a much slower process which asks for much less accuracy and is therefore relatively cheap.

In a first embodiment the telecommunication system according to the invention is characterized in that the transmitter means and the receiver means are disposed near to each other on a same substrate.

When both the transmitter means and the receiver means are disposed on the substrate, information transmission by means of changes of ambient temperature is effected fully or in part through the substrate. As the heat conduction of the substrate is better so will the information transmission (faster).

In a second embodiment the telecommunication system according to the invention is characterized in that the transmitter means is disposed on one side of the substrate and the receiver means on the other side of the substrate.

Because the transmitter means and receiver means are disposed on opposite sides of the substrate, this is in essence decisive for the magnitude of the breakdown voltage and the transceiver arrangement has a very good DC isolation.

In a third embodiment the telecommunication system according to the invention is characterized in that the transmitter means comprises a resistor and the receiver means comprises a second resistor.

This is a very cost-effective realisation in which the second resistor may be arranged as an NTC resistor (Negative Temperature Coefficient) or as a PTC resistor (Positive Temperature Coefficient) having a temperature coefficient of, for example, $\pm 6{,}000$ ppm/K, whereas the resistor belonging to the transmitter means may be arranged as a standard transistor having a temperature coefficient of, for example, $\pm 150$ ppm/K.

In a fourth embodiment the telecommunication system according to the invention is characterized in that the second resistor is included in a Wheatstone bridge.

By having a Wheatstone bridge include the second resistor together with a third resistor which has the same temperature coefficient as the second resistor but lies outside the sphere of influence of the standard resistor belonging to the transmitter means, there is achieved that the undesired changes of ambient temperature are compensated, for example, such as the heating up of the telecommunication system due to its position in the neighbourhood of a heating radiator.

In a fifth embodiment the telecommunication system according to the invention is characterized in that the transmitter means comprises a resistor and the receiver means comprises a semiconductor element.

This is also a very cost-effective realisation in which, for example, the strongly temperature-dependent BE or BC junction of a transistor may be used as a semiconductor element. The temperature sensitiveness of such a junction is about 2 mV/K.

Needless to observe that other ways of realising the receiver means exist, for example, by including a capacitor in a tuning circuit in which the change of ambient temperature affects the tuning. However, this is a considerably more expensive realisation than the two aforementioned embodiments. Furthermore, the transmitter means may also be realised in different manners, for example, with a semiconductor element such as a transistor which dissipates power when a current flows through it.

In a sixth embodiment the telecommunication system according to the invention is characterized in that the transmitter means and the receiver means are deposited in integrated form on the substrate.

When the transmitter means and the receiver means are disposed each on either side and in integrated form on the substrate, information transmission is completely effected by means of the thermal conduction of the substrate, whereas there is maximum DC isolation.

The invention further relates to a transceiver arrangement comprising a transmitter means and a receiver means for mutually transmitting information in a DC isolated manner, to be used in a telecommunication system of the type mentioned in the opening paragraph.

Such a transceiver arrangement is disadvantageous in that it is relatively expensive.

It is a further object of the invention to provide a more cost-effective transceiver arrangement.

For this purpose, the transceiver arrangement according to the invention is characterized in that the transmitter means is essentially arranged for realising a change of ambient temperature and in that the receiver means is essentially arranged for detecting the change of ambient temperature.

In a first embodiment the transceiver arrangement according to the invention is characterized in that the transmitter means and the receiver means are disposed near to each other on a substrate.

In a second embodiment the transceiver arrangement according to the invention is characterized in that the transmitter means is disposed on one side of the substrate and the receiver means on the other side of the substrate.

In a third embodiment the transceiver arrangement according to the invention is characterized in that the transmitter means comprises a resistor and in that the receiver means comprises a second resistor.

In a fourth embodiment the transceiver arrangement according to the invention is characterized in that the second resistor is included in a Wheatstone bridge.

In a fifth embodiment the transceiver arrangement according to the invention is characterized in that the transmitter means comprises a resistor and in that the receiver means comprises a semiconductor element.

In a sixth embodiment the transceiver arrangement according to the invention is characterized in that the transmitter means and the receiver means are disposed in integrated form on the substrate.

The invention will be further explained with reference to the embodiments shown in the drawing Figures where like elements have like reference numerals.

DESCRIPTION OF THE PREFERRED EMBODIMENT

Figure 1:
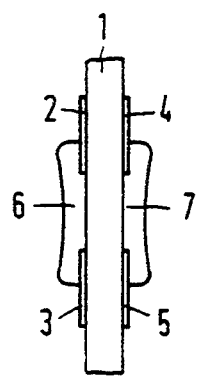
FIG. 1 shows a first embodiment of the transceiver arrangement according to the invention.

The first embodiment of the transceiver arrangement shown in FIG. 1 comprises a substrate 1 shown in cross-sectional view, including on one side a resistor 6 disposed between the conductors 2, 3 and on the other side a resistor 7 disposed between the conductors 4, 5. The substrate is, for example, made of ceramics: $Al_2O_3$ having a 96% purity as is customary in thick-film technology or a 99.6% purity for thin-film techniques, while the ceramics having the higher purity have a heat conduction that is about twice as good. The substrate 1 may also be made of AlN which displays an even better heat conduction. Resistor 6 is an integrated thick or thin-film resistor and forms the transmitter means essentially arranged for effecting a change of ambient temperature.

Resistor 7 is formed by a so-called NTC (Negative Temperature Coefficient) paste having a temperature coefficient of −6,000 ppm/K and forms the receiver means essentially arranged for detecting the change of ambient temperature.

When a voltage source or a current source is connected to conductors 2, 3, resistor 6 dissipates power which is expressed in thermal radiation which raises the ambient temperature of resistor 6. Through the heat conductive substrate 1 this heat reaches resistor 7 whose resistance drops as a result. This drop may be detected in a simple manner by means of an electronic circuit. Because resistor 6 is disposed on one side and resistor 7 on the other side of the substrate 1, the transceiver arrangement shown in FIG. 1 presents a very good DC isolation (high breakdown voltage). Measurements have shown that this transceiver arrangement is capable of transmitting an information signal within a period of time of 3 ms. Such an arrangement is thus capable of transmitting signals with a maximum frequency of approximately 200 Hz.

Figure 2:
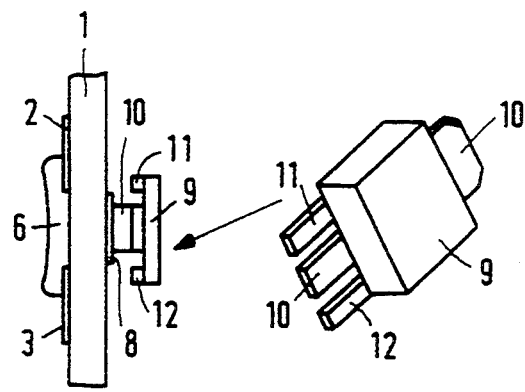
FIG. 2 shows a second embodiment of the transceiver arrangement according to the invention.

The second embodiment of the transceiver arrangement shown in FIG. 2 comprises a substrate 1 shown in cross-sectional view, on which a resistor 6 disposed between conductors 2, 3 is deposited on one side and a transistor 9 having an SOT89 housing (or a comparable SOT223 housing) soldered with its collector 10 onto conductor 8 is deposited on the other side. Furthermore, transistor 9 has a base 11 and an emitter 12. The advantage of this transistor 9 with its SOT89 housing is the low thermal resistance between junction and tab (10 K/W). In this case the base-collector junction which is strongly temperature-dependent (−2 mV/K) is used for detecting the change of ambient temperature, transistor 9 forming the receiver means essentially arranged for detecting the change of ambient temperature. This may also be simply detected by means of an electronic circuit. A disadvantage of this configuration is the extra operation needed for soldering the collector 10 of transistor 9 onto conductor 8. This disadvantage will naturally be eliminated when a transistor integrated on the substrate is used by implementing different technology.

Figure 3:
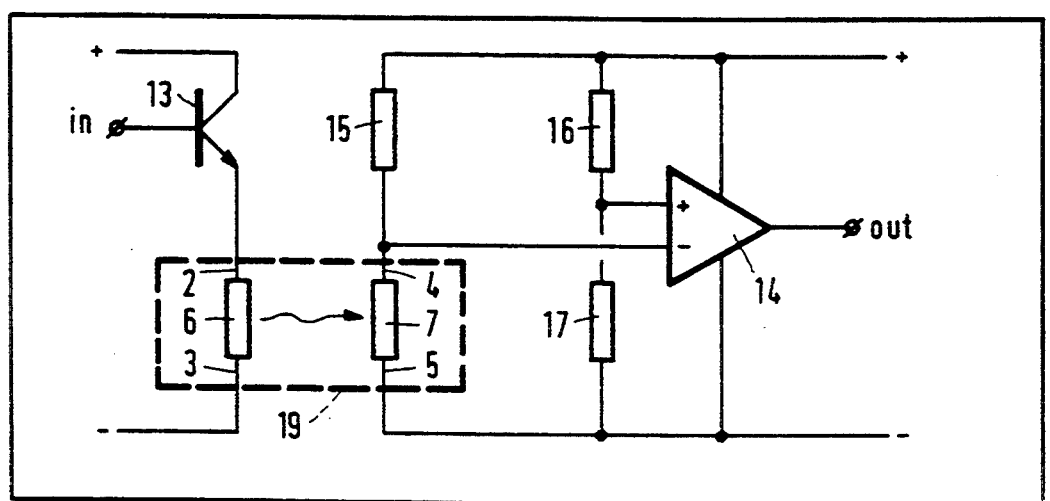
FIG. 3 shows the telecommunication system according to the invention comprising a transceiver arrangement according to the invention.

The telecommunication system 18 shown in FIG. 3 comprises a transceiver arrangement 19 which corresponds to the transceiver arrangement shown in FIG. 1. The arrangement comprises, on one hand, the resistor 6 connected to a first negative pole via conductor 3 and to a first positive pole via conductor 2 and an emitter-collector junction of a transistor 13. A base of transistor 13 forms a control input. When a current source or a voltage source is connected to this base, a current will flow through transistor 13 and through resistor 6, the latter starting to dissipate power as a result thereof which leads to a rise of ambient temperature.

On the other hand, the transceiver arrangement 19 comprises the resistor 7 connected to a second negative pole via the conductor 5 and connected to a second positive pole via the conductor 4 and a resistor 15. The junction of resistor 7 and resistor 15 is connected to an inverting input of an operational amplifier 14. A non-inverting input of operational amplifier 14 is connected to a junction of the resistor 16 further connected to the second positive pole and a resistor 17 further connected to the second negative pole.

The ratio of the resistors 15 and 7 to the ratio of the resistors 16 and 17 is such that when resistor 7 has its nominal value (because it is not heated up and there is no current flowing through it and no power is dissipated in resistor 6), the voltage on the inverting input exceeds that on the non-inverting input. Consequently, there is a low voltage present on an output of operational amplifier 14. When a current flows through resistor 6 it will raise the temperature of resistor 7, as a result of which the resistance of resistor 7 will drop. Consequently, the voltage on the inverting input will drop to below the level of the non-inverting input so that a high voltage is noticeable on the output of operational amplifier 14, which voltage denotes that there is current flowing through resistor 6 and a signal is present on the control input without there being any DC coupling. Thus the output voltage of this device constitutes a binary signal.

It is not inconceivable that in future it will be possible to deposit resistors in different layers in integrated form on one side of the substrate. In this case a transceiver arrangement could be designed deposited fully integrated on one side of the substrate. The isolation between the different layers then determines the breakdown voltage and is to provide a proper DC isolation.

When the resistor 7 together with a third resistor such as resistor 17, which has the same temperature coefficient but lies outside the sphere of the transmitter means, is included in one leg on a Wheatstone bridge in a manner known to the expert, there is achieved that undesired changes of ambient temperature are compensated, such as, for example, the heating up of the telecommunication system when it is situated in the neighbourhood of a heating radiator. In this connection it is further advantageous if both resistor 7 and this third resistor are deposited in integrated form.

Needless to observe that it is alternatively possible to use "cooling" transmitter means which causes a drop of ambient temperature in lieu of above "heating" transmitter means which causes a rise of ambient temperature. Such a temperature drop may again be detected with the receiver means described above.

I claim:

1. A telecommunication system comprising a transceiving device for transmitting information in a DC isolated manner, characterized in that said transceiving device comprises:
    a thermally conducting, electrically insulating substrate,
    thermal transmitter means disposed on said substrate for changing the temperature of said substrate in response to receipt of an information signal, and
    thermal receiver means disposed on said substrate near said thermal transmitting means, for sensing the changing temperature of said substrate and producing an electrical output condition corresponding to said information signal.

2. Telecommunication system as claimed in claim 1, characterized in that the transmitter means is disposed on one side of the substrate and the receiver means on the other side of the substrate.

3. Telecommunication system as claimed in claim 2, characterized in that the transmitter means comprises a resistor and the receiver means comprises a semiconductor element.

4. Telecommunication system as claimed in claim 3, characterized in that the transmitter means and the receiver means are deposited in integrated form on the substrate.

5. Telecommunication system as claimed in claim 2, characterized in that the transmitter means comprises a resistor and the receiver means comprises a second resistor.

6. Telecommunication system as claimed in claim 5, characterized in that the second resistor is included in one leg of a Wheatstone bridge.

7. Telecommunication system as claimed in claim 6, characterized in that the transmitter means and the receiver means are deposited in integrated form on the substrate.

8. Telecommunication system as claimed in claim 5, characterized in that the transmitter means and the receiver means are deposited in integrated form on the substrate.

9. A system as claimed in claim 1, characterized in that said thermal transmitter means and said thermal receiver means are arranged to transmit signals with a maximum frequency of approximately 200 Hz.

10. A transceiving device for transmitting information in the form of a binary electrical signal, in a DC isolated manner, characterized in that said transceiving device comprises:
    a thermally conducting, electrically insulating substrate,
    transmitter means, constituted by an electrical element disposed on said substrate for changing the temperature of said substrate in response to electrical current flow through said element upon receipt of said information in the form of a binary electrical signal, and
    receiver means disposed on said substrate near said thermal transmitting means, for sensing the changing temperature of said substrate and producing a change in electrical output condition responsive to flow of current through said element.

11. Transceiver arrangement as claimed in claim 10, characterized in that the transmitter means is disposed on one side of the substrate and the receiver means on the other side of the substrate.

12. Transceiver arrangement as claimed in claim 11, characterized in that the transmitter means comprises a resistor and in that the receiver means comprises a semiconductor element.

13. Transceiver arrangement as claimed in claim 12, characterized in that the transmitter means and the receiver means are disposed in integrated form on the substrate.

14. Transceiver arrangement as claimed in claim 11, characterized in that the transmitter means comprises a resistor and in that the receiver means comprises a second resistor.

15. Transceiver arrangement as claimed in claim 14, characterized in that the second resistor is included in a Wheatstone bridge.

16. Transceiver arrangement as claimed in claim 15, characterized in that the transmitter means and the receiver means are disposed in integrated form on the substrate.

17. Transceiver arrangement as claimed in claim 14, characterized in that the transmitter means and the receiver means are disposed in integrated form on the substrate.

18. A device as claimed in claim 9, characterized in that said transmitter means and said receiver means are arranged to transmit an information signal within a period of time of 3 ms.

* * * * *